Patented Feb. 26, 1929.

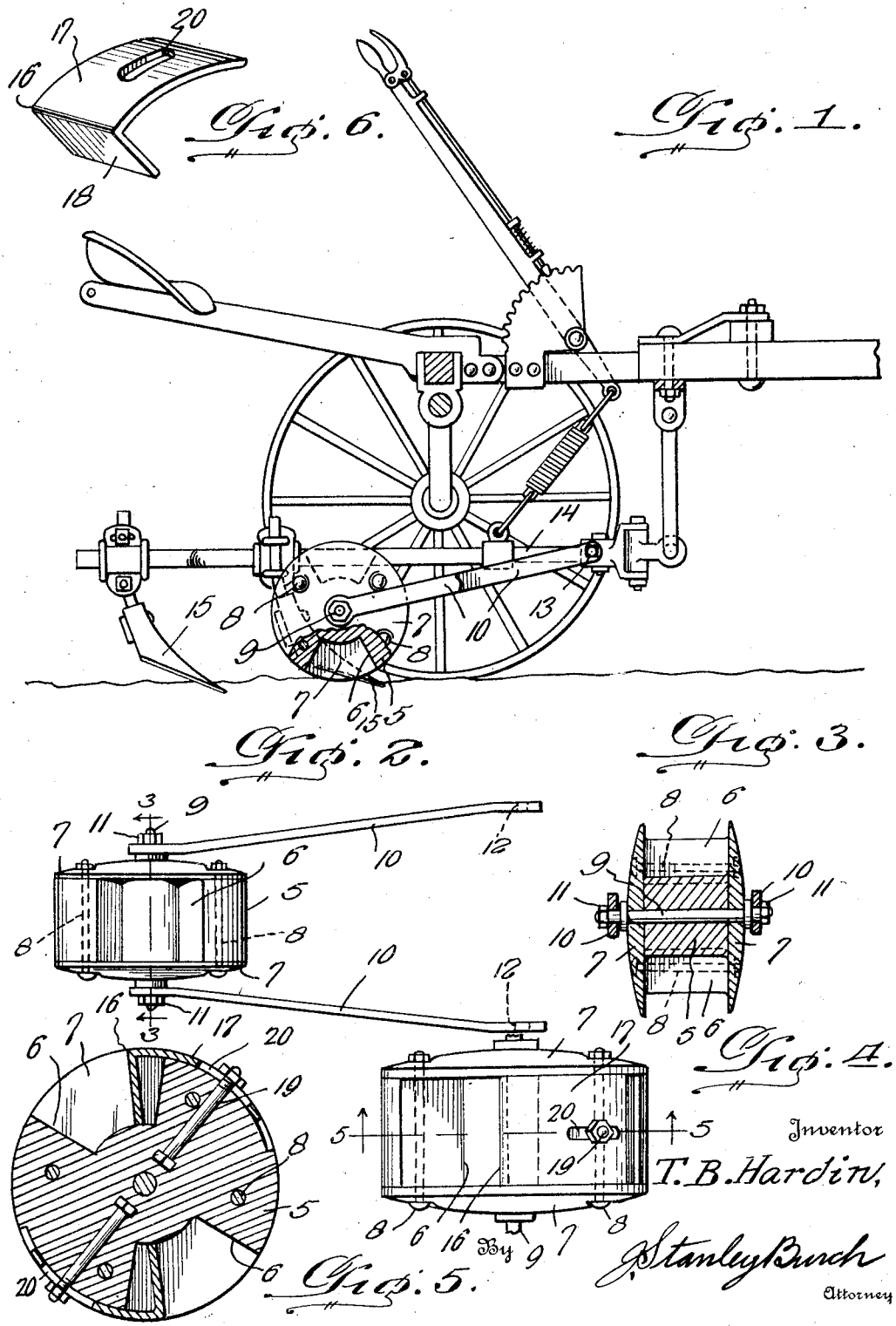

1,703,393

UNITED STATES PATENT OFFICE.

TULLY B. HARDIN, OF ABILENE, TEXAS.

COTTON BLOCKER.

Application filed June 28, 1927. Serial No. 202,043.

This invention relates to improvements in cotton blockers, and has more particular reference to a device of this kind including a pocketed rolling drum adapted to be drawn along rows of growing plants for the purpose of thinning the latter by crushing the superfluous plants and leaving the rest standing at proper intervals.

The primary object of the invention is to provide a device of the above kind which is extremely simple and durable in construction, as well as efficient and reliable in operation.

A further object is to provide a blocking drum of durable and simple construction adapted to be drawn between the shovels of a cultivator and embodying a series of peripheral pockets closed at the sides to prevent the cultivator shovels from throwing dirt onto and covering up the young plants which are left standing.

A still further object is to provide a drum which may be readily and cheaply constructed and assembled, and which embodies a main disk provided with a series of peripheral notches and side disks closing the sides of the notches to form the pockets and act as fenders for preventing the young plants from being covered by dirt thrown toward the row of plants by the cultivator shovels.

Still another object is to provide means to adjust the effective size of the notches or pockets so that the amount and spacing of the plants left standing may be regulated as found most desirable.

The invention consists in the novel form, combination and arrangement of parts hereinafter more fully described, shown in the accompanying drawing and claimed.

In the drawing, wherein like reference characters indicate corresponding parts throughout the several views;

Figure 1 is a view of a cotton blocker, constructed in accordance with the present invention, operatively associated with a cultivator, the view being partly in side elevation and partly in section.

Figure 2 is a top plan view of the cotton blocker, detached.

Figure 3 is a transverse section on line 3—3 of Figure 2.

Figure 4 is a top plan view of a modified form of blocking drum.

Figure 5 is a section on line 5—5 of Figure 4, and

Figure 6 is an enlarged perspective view of one of the slides used for adjusting the effective size of the pockets of the drum shown in Figures 4 and 5.

The present cotton blocker consists of a blocking drum composed of a relatively thick solid main disk 5 provided with a series of peripheral notches 6, and thin side disks 7 rigidly connected to the sides of the main disk or body 5 so as to close the sides of the notches 6 and form spaced peripheral pockets in the drum. The disks 5 and 7 are of the same diameter and may be made separate and bolted together by transverse bolts 8. The main disk 5 is preferably formed of wood or concrete and the side disks 7 of metal so as to give the required weight for crushing the plants.

The drum is provided with a transverse axial opening formed by alined central openings in the disks 5 and 7, and extending through this axial opening is an axle 9 upon which the drum is journaled.

A pair of draw bars 10 are provided which have their rear ends pivotally engaged with and removably retained on the projecting ends of the axle 9 by nuts 11, and which are apertured, as at 12, at their forward ends to facilitate pivotal bolting of the same, as at 13, to parts of the cultivator, such as to the inner sides of the forward ends of the drag bars 14 on which the shovels 15 are mounted. In this way, the bars 10 are capable of free vertical swinging movement so that the drum may follow irregularities in the surface of the ground. Moreover, the bars 10 are of such length as to position the drum between the inner forward shovels of the cultivator so that the side disks 7 will act as fenders to prevent the block of plants which are left standing from being covered by the dirt, these particular plants being in a pocket of the drum when the forward cultivator shovels are throwing dirt toward them.

The notches 6 preferably have inwardly convergent transverse radial walls and are of suitable dimensions for ordinary purposes to accommodate the plants which are to be left standing. However, should it be desired to vary the size of the blocks of plants left standing and to vary the distance therebetween, suitable adjustable slides 16 may be provided to change the effective size of the pockets of the drum. As shown, one slide is associated with each pocket, and each slide includes an arcuate plate 17 countersunk in the periphery of and circumferentially adjustable relative to the notched main disk 5, and an inwardly projecting radial wall plate 18 rigid with one end of the plate 17 and slidably fitting in the adjacent notch 6 of said disk 5. The adjustments of the slides 16 may be maintained by radial clamping bolts 19 carried by the disk 5 and extending outwardly through longitudinal elongated slots 20 in the slide plates 17.

In operation, the drum is drawn along the row of plants and, by reason of contact with the ground is caused to turn. The plants which enter the pockets of the drum are obviously left standing, while those intervening are crushed into the ground by the peripheral portions of the drum between the pockets.

The device may be quickly and easily applied to or detached from a conventional straddle-row cultivator and in view of the simplicity of the device, it may be manufactured and marketed at a nominal cost. Further, the construction is quite durable, and by reason of the drum construction, the plants left standing are effectively protected against being covered with dirt during the cultivating and blocking operation.

Minor changes may be made without departing from the spirit and scope of the invention as claimed.

What I claim is:—

In a cotton blocker, a disk having a series of peripheral notches, and peripheral slides adjustable circumferentially of said disk for varying the effective size of said notches, said slides embodying arcuate plate members slidably countersunk in the periphery of said disk and having inwardly projecting end plate members rigid therewith and projecting into said notches.

In testimony whereof I affix my signature.

TULLY B. HARDIN.